(12) United States Patent
Grose et al.

(10) Patent No.: US 7,873,920 B2
(45) Date of Patent: Jan. 18, 2011

(54) METHODS AND SYSTEMS FOR DISPLAYING NETWORK INFORMATION

(75) Inventors: David L. Grose, Poulsbo, WA (US); Thomas E. Sherer, Everett, WA (US)

(73) Assignee: The Boeing Company, Chicago, IL (US)

( * ) Notice: Subject to any disclaimer, the term of this patent is extended or adjusted under 35 U.S.C. 154(b) by 789 days.

(21) Appl. No.: 11/768,098

(22) Filed: Jun. 25, 2007

(65) Prior Publication Data
US 2008/0319719 A1    Dec. 25, 2008

(51) Int. Cl.
*G06F 15/00* (2006.01)
*G06F 13/00* (2006.01)

(52) U.S. Cl. ............................. 715/848; 715/850

(58) Field of Classification Search ......... 715/850–855, 715/861, 766, 821, 836, 848; 345/427–428
See application file for complete search history.

(56) References Cited

U.S. PATENT DOCUMENTS

| | | | |
|---|---|---|---|
| 6,141,776 A | 10/2000 | Grose et al. | |
| 6,154,213 A * | 11/2000 | Rennison et al. | 715/854 |
| 6,292,830 B1 | 9/2001 | Taylor et al. | |
| 6,877,153 B2 | 4/2005 | Konnersman | |
| 7,250,944 B2 * | 7/2007 | Anderson et al. | 345/419 |
| 2001/0032029 A1 | 10/2001 | Kauffman | |
| 2002/0054117 A1 | 5/2002 | van Dantzich et al. | |
| 2003/0014379 A1 | 1/2003 | Saias et al. | |
| 2004/0088577 A1 | 5/2004 | Render | |
| 2004/0090472 A1 * | 5/2004 | Risch et al. | 345/853 |
| 2005/0076313 A1 | 4/2005 | Pegram et al. | |
| 2005/0096950 A1 | 5/2005 | Caplan et al. | |
| 2005/0180330 A1 | 8/2005 | Shapiro | |
| 2005/0197875 A1 | 9/2005 | Kauffman | |
| 2006/0235658 A1 | 10/2006 | Nitta et al. | |

* cited by examiner

*Primary Examiner*—Cao (Kevin) Nguyen
(74) *Attorney, Agent, or Firm*—Armstrong Teasdale LLP

(57) ABSTRACT

Methods and systems for displaying a network structure using force-directed layout are provided. The network includes a plurality of nodes, each node including an associated slack parameter having a value. The method including selecting a central time-directed axis, positioning each network node along the axis using the associated slack parameter value of the network node to determine a distance from the central time-directed axis, and applying force-directed computations to sets of concurrent nodes.

17 Claims, 8 Drawing Sheets

METHODS AND SYSTEMS FOR DISPLAYING NETWORK INFORMATION

BACKGROUND

Embodiments of the disclosure relate generally to methods and systems for displaying information and more particularly, to methods and systems for displaying information that facilitates visual perception of a network organization.

Feed-forward networks are used to represent the precedence relationships and steps of planning and scheduling models. Such models are often represented and displayed as a directed graph along a time axis. If such a network is large, the resulting graph display becomes difficult to interpret.

Many methods of layout and display are used to aid in visualization of information organized into a network. Force-directed layout is a somewhat effective automated technique of spatially separating and orienting nodes in a graph, however such a layout may not effectively reveal key information contained in the network.

What are needed are methods and systems for providing visual displays of networks having an orderly and meaningful layout, which reveals more information about the network and make its contents more understandable while utilizing automated layout and preserving the time ordinal axis.

SUMMARY

In one embodiment, a method of displaying a network structure using force-directed layout is provided. The network includes a plurality of nodes, each node including an associated slack parameter having a value. The method including selecting a central time-directed axis, positioning each network node along the axis using the associated slack parameter value of the network node to determine a distance from the central time-directed axis, and applying force-directed computations to sets of concurrent nodes.

In another embodiment, a system for displaying a network structure includes a database embodied on a computer readable media wherein the database includes data relating to a feed forward network and force-directed layout computations for the network. The system also includes a processor configured to receive data from the database. The processor includes a sequencing component configured to partition the feed-forward network into sets of concurrent nodes, and a layout management component configured to simulate the application of forces to each set of concurrent nodes to determine the spatial arrangement of the sets of nodes.

In yet another embodiment, a computer readable medium is encoded with a program that is configured to instruct a computer to display a network structure using force-directed layout wherein the network includes a plurality of nodes positioned along a central time-directed axis using a slack parameter value associated with each node to determine a distance of respective nodes from the central time-directed axis.

DETAILED DESCRIPTION

The following detailed description illustrates the disclosure by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure. The disclosure is described as applied to a preferred embodiment, namely, a process of forming airplane fuselage barrels. However, it is contemplated that this disclosure has general application to manufacturing major components and assemblies where adherence to a specified set of dimensional tolerances is desired, particularly where the weight of the component and/or manufacturing tooling generates a deviation from manufacturing tolerances.

Figure 1:
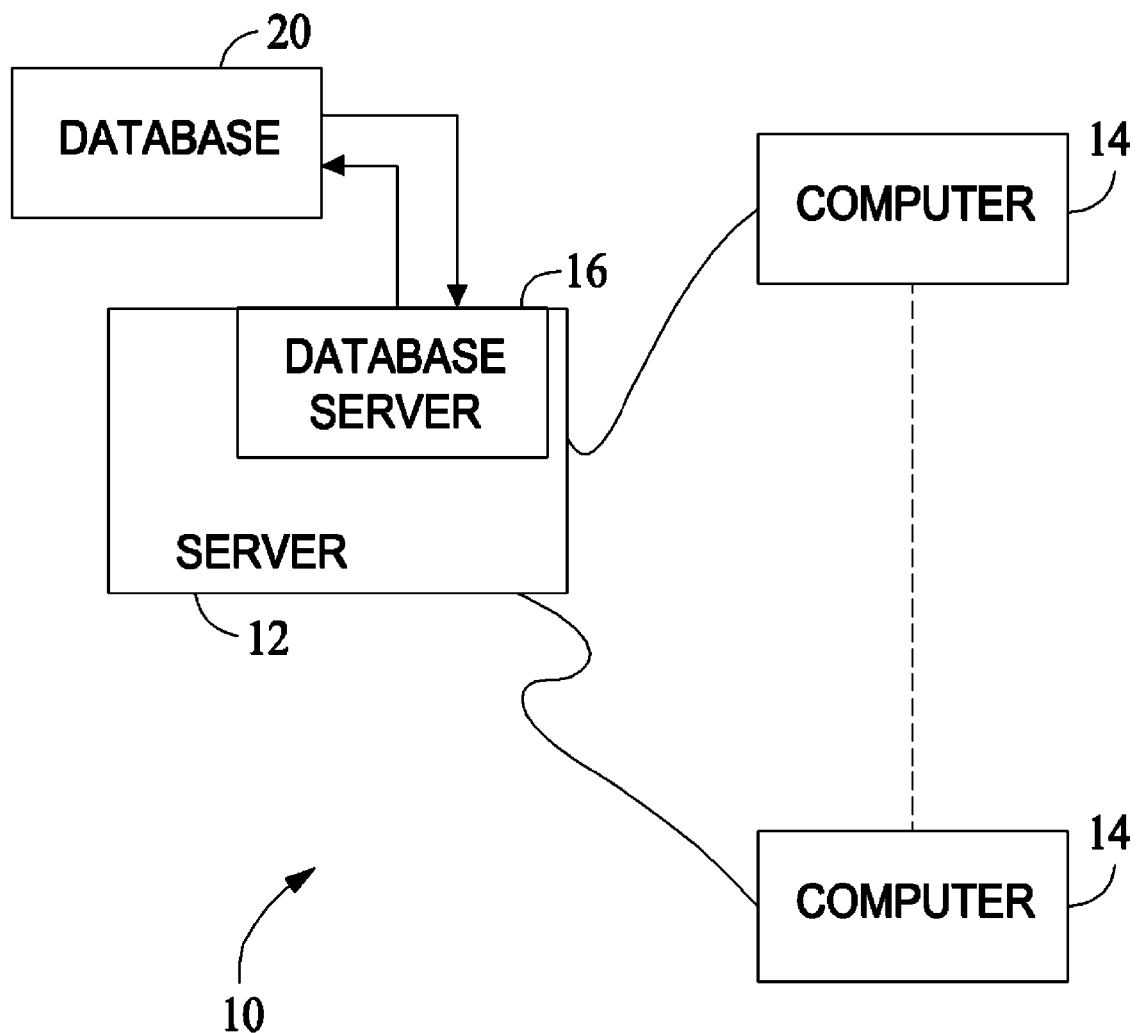
FIG. 1 is a simplified block diagram of an exemplary embodiment of a Network Display System (NDS) including a server system, and a plurality of client sub-systems.

FIG. 1 is a simplified block diagram of an exemplary embodiment of a Network Display System (NDS) 10 including a server system 12, and a plurality of client sub-systems, also referred to as client systems 14, connected to server system 12. Computerized modeling and grouping tools, as described below in more detail, are stored in server 12 and can be accessed by a requester at any one of computers 14. In one embodiment, client systems 14 are computers including a web browser, such that server system 12 is accessible to client systems 14 using the Internet. Client systems 14 are interconnected to the Internet through many interfaces including a network, such as a local area network (LAN) or a wide area network (WAN), dial-in-connections, cable modems, and special high-speed ISDN lines. Client systems 14 could be any device capable of interconnecting to the Internet including a web-based phone, personal digital assistant (PDA), or other web-based connectable equipment. A database server 16 is connected to a database 20 containing information relating to feed forward networks for example, three dimensional feed forward networks and force-directed layout techniques, as described below in greater detail. In one embodiment, centralized database 20 is stored on server system 12 and can be accessed by potential users at one of client systems 14 by logging onto server system 12 through one of client systems 14. In an alternative embodiment, database 20 is stored remotely from server system 12 and may be non-centralized.

Figure 2:
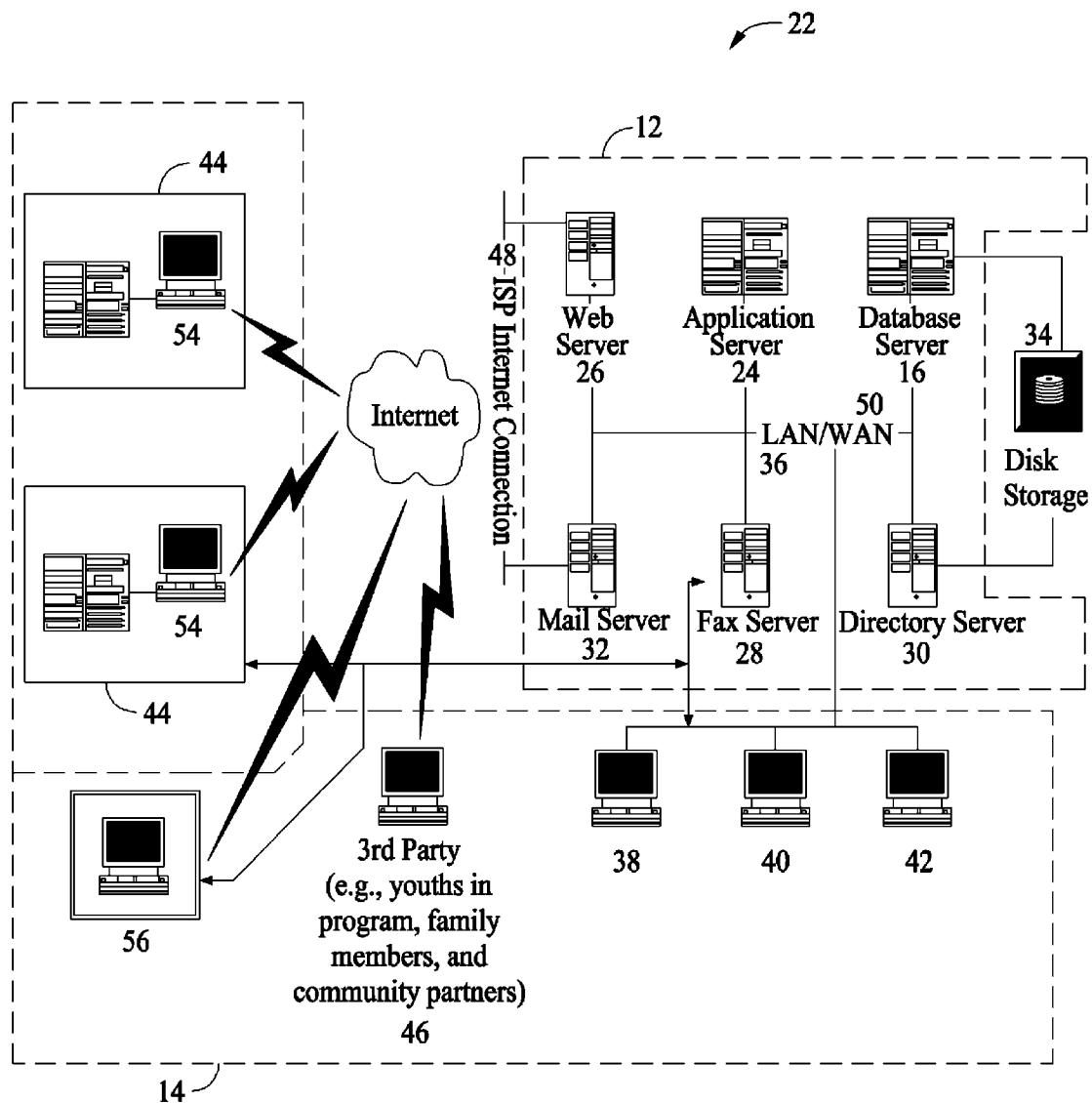
FIG. 2 is an expanded block diagram of an exemplary embodiment of a server architecture for the Network Display System.

FIG. 2 is an expanded block diagram of an exemplary embodiment of a server architecture for a Network Display System 22. Components in system 22, identical to components of system 10 (shown in FIG. 1), are identified in FIG. 2 using the same reference numerals as used in FIG. 1. System 22 includes server system 12 and client systems 14. Server system 12 further includes database server 16, an application server 24, a web server 26, a fax server 28, a directory server 30, and a mail server 32. A disk storage unit 34 is coupled to database server 16 and directory server 30. Servers 16, 24, 26, 28, 30, and 32 are coupled in a local area network (LAN) 36. In addition, a system administrator's workstation 38, a user workstation 40, and a supervisor's workstation 42 are coupled to LAN 36. Alternatively, workstations 38, 40, and 42 are coupled to LAN 36 using an Internet link or are connected through an Intranet.

Each workstation 38, 40, and 42 may be a personal computer having a web browser. Although the functions performed at the workstations typically are illustrated as being performed at respective workstations 38, 40, and 42, such functions can be performed at one of many personal computers coupled to LAN 36. Workstations 38, 40, and 42 are illustrated as being associated with separate functions only to facilitate an understanding of the different types of functions that can be performed by individuals having access to LAN 36.

Server system 12 is configured to be communicatively coupled to various individuals, including employees 44 and to third parties 46 using an ISP Internet connection 48. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 50, local area network 36 could be used in place of WAN 50.

In the exemplary embodiment, any authorized individual having a workstation 54 can access system 22. At least one of the client systems includes a manager workstation 56 located at a remote location. Workstations 54 and 56 are personal computers having a web browser. Also, workstations 54 and 56 are configured to communicate with server system 12. Furthermore, fax server 28 communicates with remotely located client systems, including a client system 56 using a telephone link. Fax server 28 is configured to communicate with other client systems 38, 40, and 42 as well.

Figure 3:
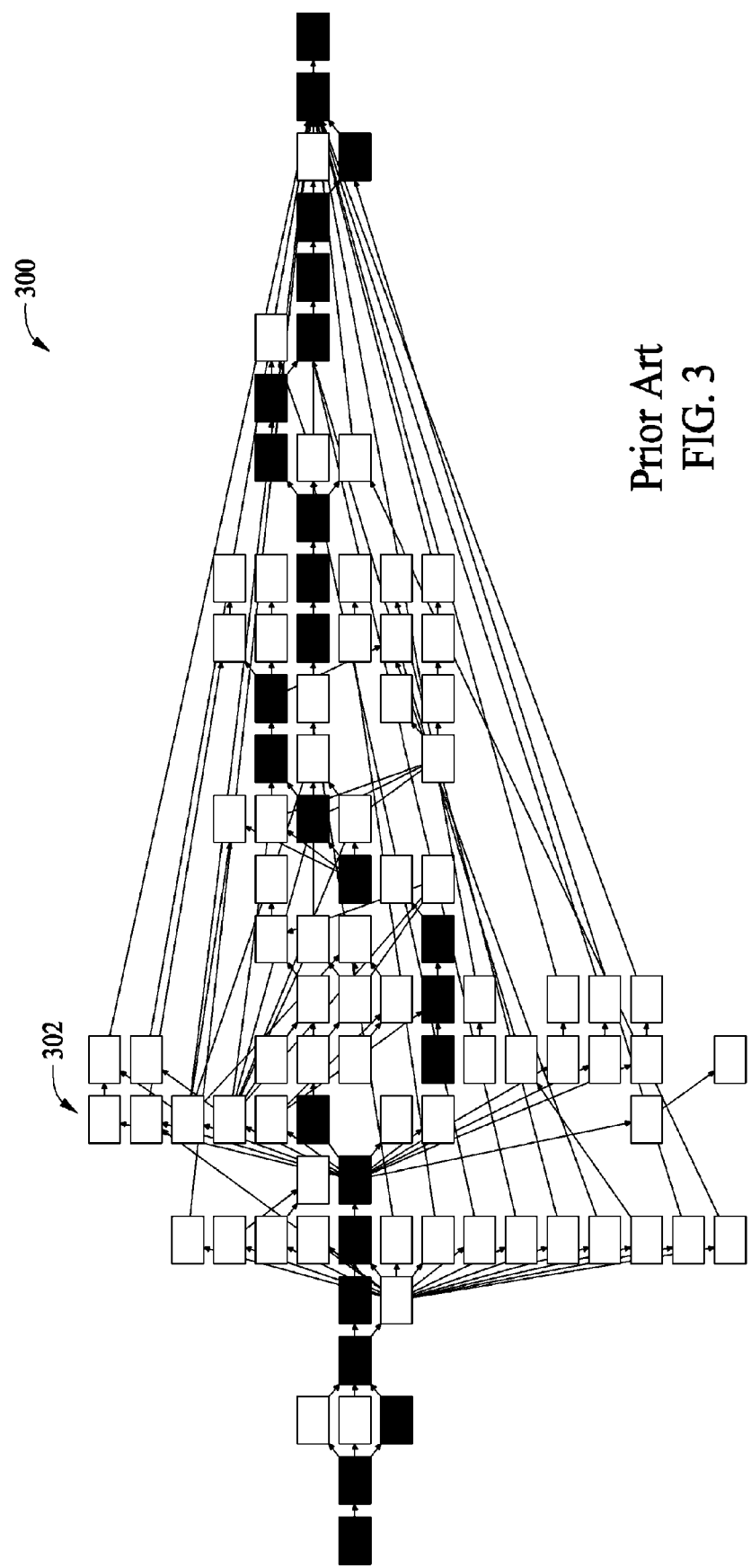
FIG. 3 is a known two-dimensional network layout.

FIG. 3 is a known two-dimensional network layout 300. Layout 300 includes a plurality of nodes 302 positioned without using slack for axis orientation or force-direction as is typical for a network diagram display. Edges of nodes are connected to other nodes.

Figure 4:
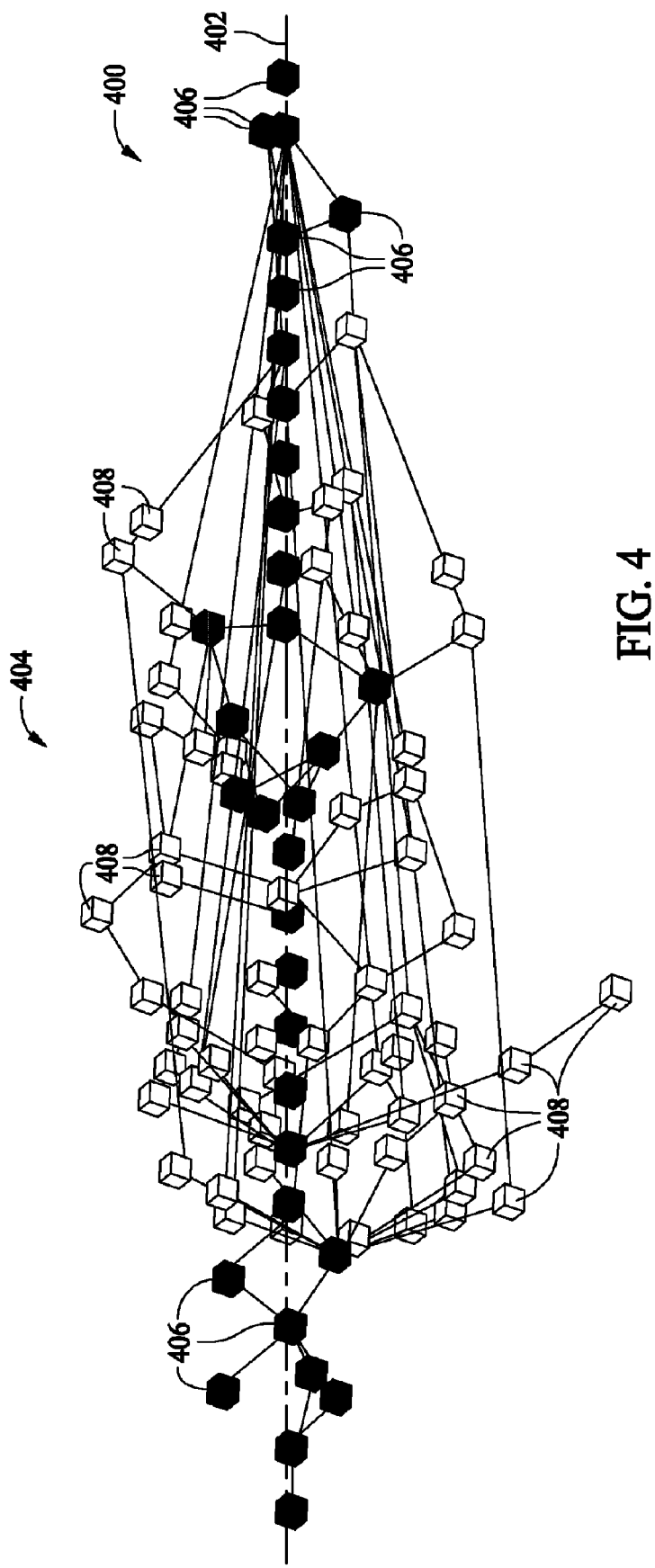
FIG. 4 is force-directed layout of a feed-forward network in accordance with an exemplary embodiment of the disclosure.

FIG. 4 is force-directed layout of a feed-forward network 400 in accordance with an exemplary embodiment of the disclosure. Standard network characteristics may be used in the layout to add meaning to displayed data. In the exemplary embodiment, the layout of feed-forward network 400 is along a left-to-right axis 402. The layout decision methodology is a non-trivial problem for the display of any large network. Current layout methodology results in overly crowded and difficult to interpret displays of information. Networks containing many nodes may be substantially indecipherable. The layout displays feed-forward network 400 in three dimensions by using various network 400 connection properties such that when implemented on a computer equipped with 3D graphics display capability, an intuitive interactive layout of a large network is displayed.

In the exemplary embodiment, the layout includes a central time-directed axis 402 and a plurality of network nodes 404 that each includes an associated slack parameter having a value. The slack parameter of each network node is used to determine a distance of the network node from central time-directed axis 402. Other ones of the plurality of network nodes 404 are positioned using a force-directed layout technique wherein nodes 404 are considered to be physical objects with mutually repulsive forces, like protons or electrons. Connections between nodes also follow a physical analogy and are considered to be metal springs attached to a pair of nodes. The springs produce repulsive or attractive forces between their endpoints if the springs are too short or too long. The layout simulates physical forces and rearranges the positions of the nodes in such a way that the sum of the forces emitted by the nodes and the edges reaches a (local) minimum. Resulting layouts often expose the inherent symmetric and clustered structure of a network, a well-balanced distribution of nodes, and few edge crossings. The layout is well suited for the visualization of highly connected backbone regions.

To lay out feed forward network 400 in three dimensions, in accordance with an embodiment of the present disclosure, nodes 406 having zero slack values are selected to lie on or near axis 402 and nodes 408 having higher slack values are positioned about axis 402 using a force-directed layout technique. Nodes may be illustrated using varying shades of monochrome or varying colors relative to the slack value associated with each node.

Feed-forward network 400 is connected by edges, each having a predecessor and a successor. A sequencing component partitions feed-forward network 400 into sets of concurrent nodes. The sequencing component determines a first set of concurrent nodes by selecting all nodes which are not successors of any edge in the network. The second set of concurrent nodes are those nodes which are successors only of edges whose predecessors are contained in first set of nodes. Subsequent sets are formed by selecting nodes which are successors only for edges for which the predecessors are contained in the previous concurrent sets of nodes. This is repeated until the entire network is partitioned into sets of concurrent nodes. The sets of concurrent nodes are maintained in the sequential order of construction. For each node in the network, the slack value is computed (which may be performed using a standard method such as CPM).

A layout management component for each set of concurrent nodes simulates the application of forces to determine the spatial arrangement of those nodes. For each set of concurrent nodes, the layout manager determines those edges for each node where that node is a predecessor and the successor node of the edge is in the nearest following set of concurrent nodes where the resulting set of edges is not empty. The result is a set of earliest following nodes (which may be empty) for each node in the network.

The layout manager places single zero slack-value nodes in positions on axis 402 in the order which the concurrent sets were constructed. All other nodes are placed using a force-directed method placing each node on the plane perpendicular to the forward axis. The earliest following edges of each node are modeled as physical springs and the nodes within each concurrent set are modeled to repel each other. The layout process is repeated over all sets of concurrent nodes until a user decides a satisfactory result has been reached.

Figure 5A:
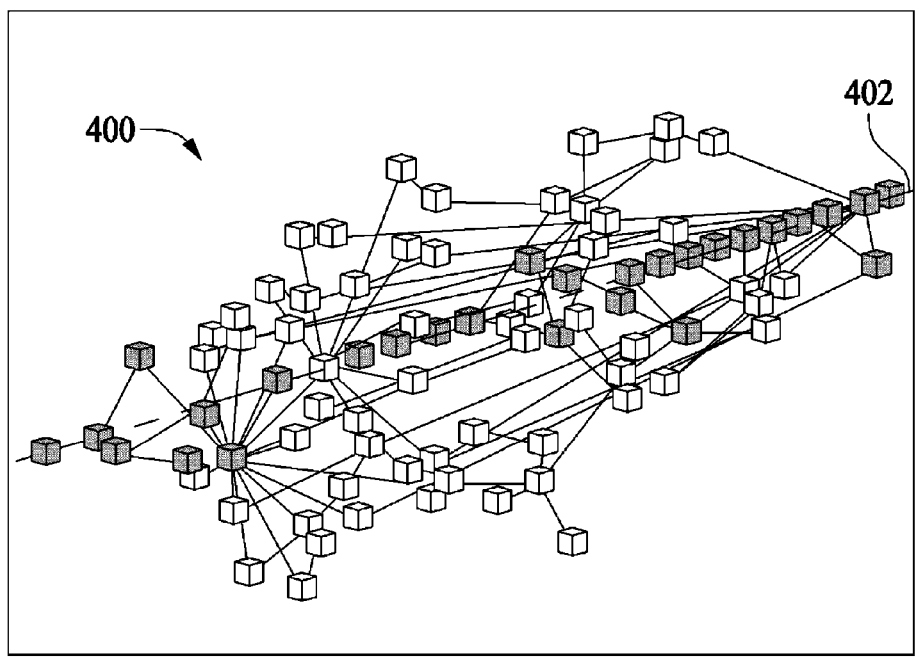
FIG. 5A is a perspective view of the network shown in FIG. 4 from a different viewpoint.
Figure 5B:
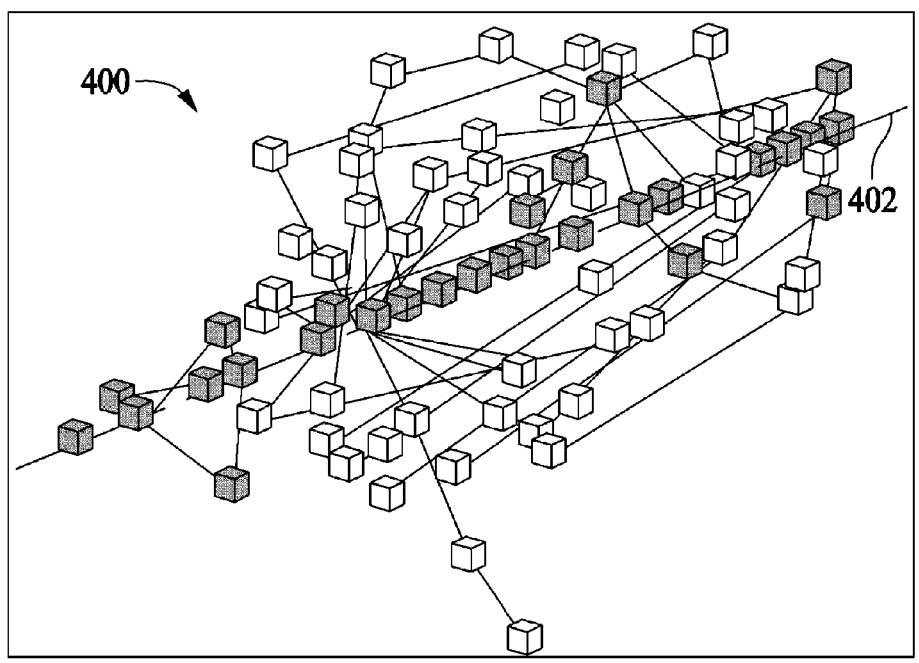
FIG. 5B is a perspective view of the network shown in FIG. 4 from another viewpoint.
Figure 5C:
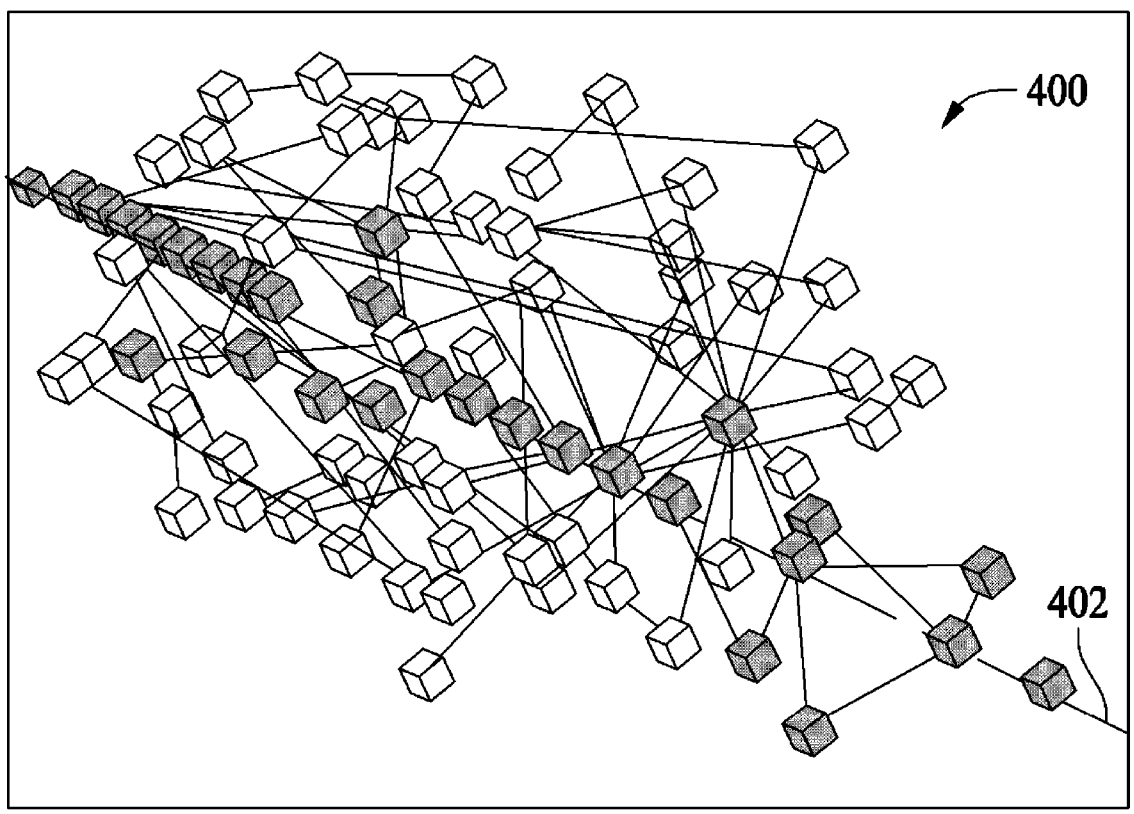
FIG. 5C is a perspective view of the network shown in FIG. 4 from still another viewpoint.

FIGS. 5A, 5B, and 5C are perspective views of network 400 from different viewpoints. A user interacts with network 400 through an animation and viewing component implemented on a desktop computer equipped with hardware and software capable of displaying three dimensional graphical representations. The user may rotate network 400 around any axis to view network 400. The view may be zoomed in and out from any viewpoint and animations of the changing shape of network 400 in relation to the user changing network characteristics may also be viewed.

Figure 6:
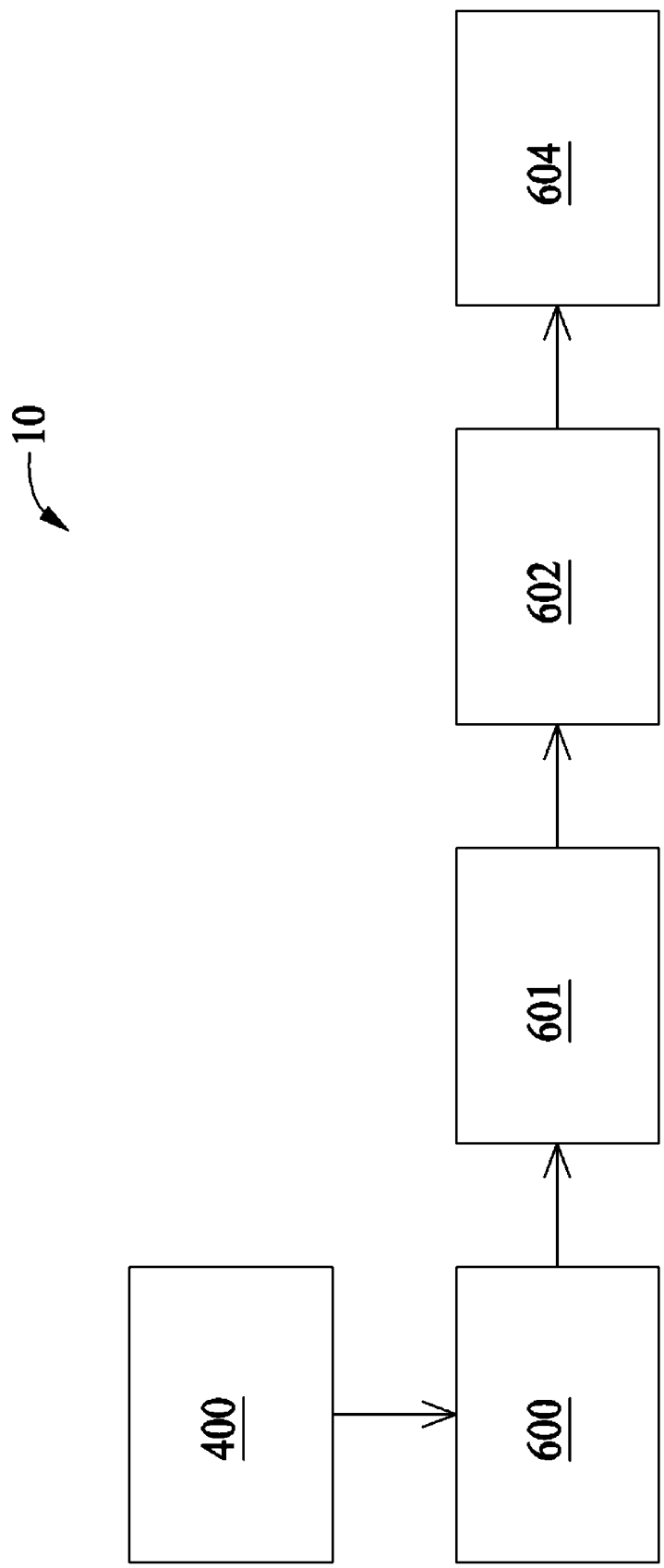
FIG. 6 is a block data flow diagram of an exemplary embodiment of the Network Display System.

FIG. 6 is a block data flow diagram of an exemplary embodiment of Network Display System 10. In the exemplary embodiment, Network Display System 10 includes a sequencing component 600 that partitions feed-forward network 400 into sets of concurrent nodes. Sequencing component 600 determines a first set of concurrent nodes by selecting all nodes which are not successors of any edge in the network. The second set of concurrent nodes are those nodes which are successors only of edges whose predecessors are contained in first set of nodes. Subsequent sets are formed by selecting nodes which are successors only for edges for which the predecessors are contained in the previous concurrent sets of nodes. This is repeated until the entire network is partitioned into sets of concurrent nodes. The sets of concurrent nodes are maintained in the sequential order of construction. For each node in the network, the slack value is computed (which may be performed using a standard method such as CPM).

A layout management component 602 for each set of concurrent nodes simulates the application of forces to determine the spatial arrangement of those nodes. For each set of concurrent nodes, layout manager 602 determines those edges for each node where that node is a predecessor and the successor node of the edge is in the nearest following set of concurrent nodes where the resulting set of edges is not empty. The result is a set of earliest following nodes (which may be empty) for each node in the network.

Layout manager 602 places single zero slack-value nodes in positions on axis 402 in the order which the concurrent sets were constructed. All other nodes are placed using a force-directed method placing each node on the plane perpendicular to the forward axis. The earliest following edges of each node are modeled as physical springs and the nodes within each concurrent set are modeled to repel each other. The layout process is repeated over all sets of concurrent nodes until a user decides a satisfactory result has been reached.

A user interacts with Network Display System 10 through an animation and viewing component 604 implemented on, for example, but not limited to a desktop computer equipped with hardware and software capable of displaying three dimensional graphical representations.

Figure 7:
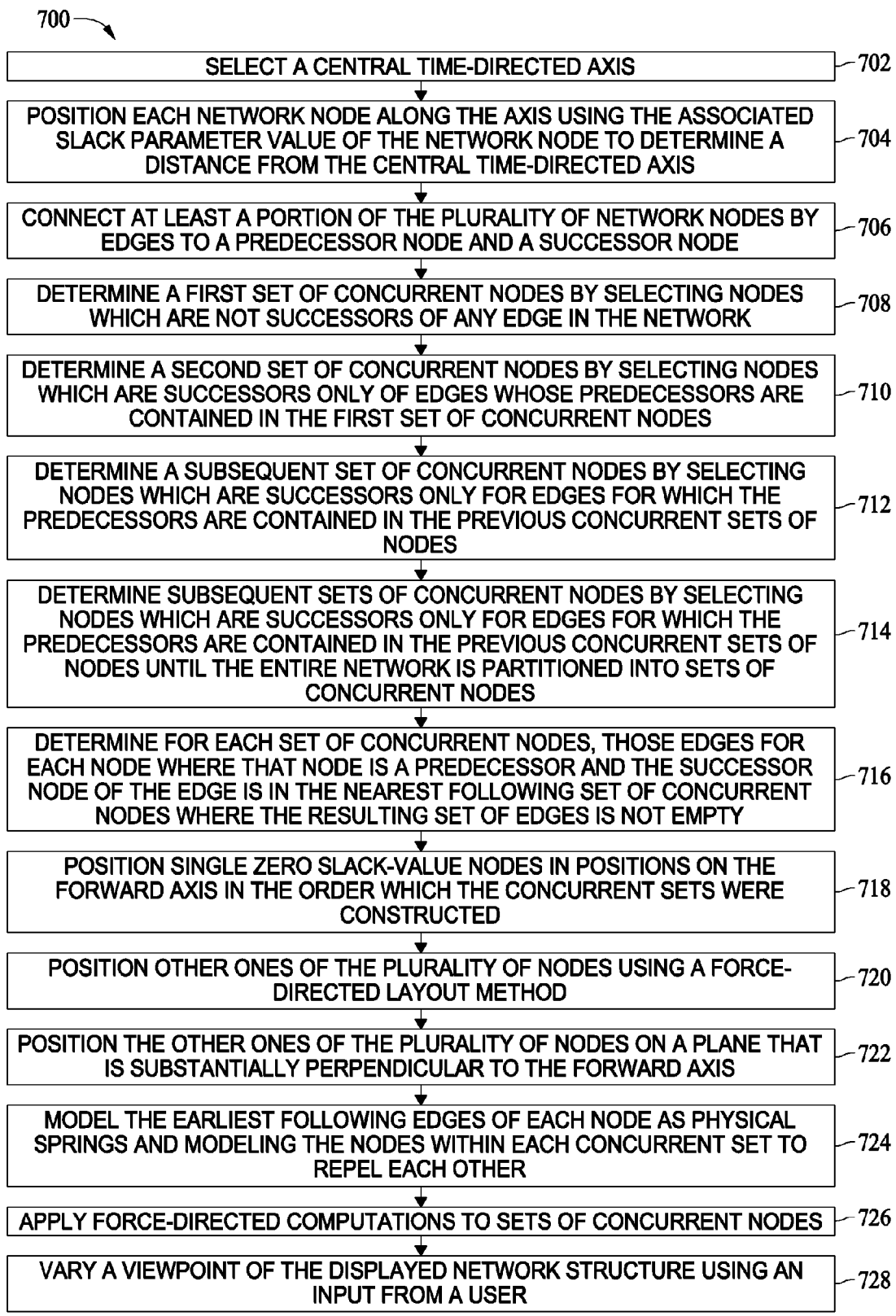
FIG. 7 is a flow chart of an exemplary method of displaying a network structure using force-directed layout and associated slack parameters for at least some network nodes.

FIG. 7 is a flow chart of an exemplary method 700 of displaying a network structure using force-directed layout and associated slack parameters for at least some network nodes. Method 700 includes selecting 702 a central time-directed axis, positioning 704 each network node along the axis using the associated slack parameter value of the network node to determine a distance from the central time-directed axis, and connecting 706 at least a portion of the plurality of network nodes by edges to a predecessor node and a successor node. Method 700 includes determining 708 a first set of concurrent nodes by selecting nodes which are not successors of any edge in the network, determining 710 a second set of concurrent nodes by selecting nodes which are successors only of edges whose predecessors are contained in the first set of concurrent nodes, and determining 712 a subsequent set of concurrent nodes by selecting nodes which are successors only for edges for which the predecessors are contained in the previous concurrent sets of nodes. Method 700 further includes determining 714 subsequent sets of concurrent nodes by selecting nodes which are successors only for edges for which the predecessors are contained in the previous concurrent sets of nodes until the entire network is partitioned into sets of concurrent nodes, determining 716 for each set of concurrent nodes, those edges for each node where that node is a predecessor and the successor node of the edge is in the nearest following set of concurrent nodes where the resulting set of edges is not empty, and positioning 718 single zero slack-value nodes in positions on the forward axis in the order which the concurrent sets were constructed. Method 700 also includes positioning 720 other ones of the plurality of nodes using a force-directed layout method, positioning 722 the other ones of the plurality of nodes on a plane that is substantially perpendicular to the forward axis, and modeling 724 the earliest following edges of each node as physical springs and modeling the nodes within each concurrent set to repel each other. Method 700 also includes applying 726 force-directed computations to sets of concurrent nodes, and varying 728 a viewpoint of the displayed network structure using an input form a user.

As will be appreciated by one skilled in the art and based on the foregoing specification, the above-described embodiments of the disclosure may be implemented using computer programming or engineering techniques including computer software, firmware, hardware or any combination or subset thereof, wherein the technical effect is to layout and display a feed-forward network in three dimensions by using the network's connection properties and force-directed methodologies. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described methods of laying out and displaying a feed-forward network in three dimensions using the network's connection properties and a force-directed methodology are cost-effective and highly reliable. The methods and systems include using a slack parameter value of the network nodes to position nodes along an axis and using a force-directed layout methodology to position others of the nodes using concurrent sets of nodes to limit computational overhead and produce an accurate display of the network in a relatively short time period. Accordingly, the methods and systems facilitate display of the network in a cost-effective and reliable manner.

While embodiments of the disclosure have been described in terms of various specific embodiments, those skilled in the art will recognize that the embodiments of the disclosure can be practiced with modification within the spirit and scope of the claims.

What is claimed is:

1. A computer implemented method of displaying a scheduling model as a network structure using force-directed layout wherein the network includes a plurality of nodes each node including an associated slack parameter having a value, said method comprising:
   selecting a central time-directed axis;
   positioning each network node along the central time-directed axis using the associated slack parameter value of the network node to determine a distance from the central time-directed axis;
   applying force-directed computations to sets of concurrent nodes; and
   determining a subsequent set of concurrent nodes by selecting nodes which are successors only for edges for which the predecessors are contained in the previous concurrent sets of nodes until the entire network is partitioned into sets of concurrent nodes.

2. A method in accordance with claim 1 wherein the slack parameter is a dimensionless value.

3. A method in accordance with claim 1 wherein the network structure comprises a feed-forward network structure.

4. A method in accordance with claim 1 further comprising varying a viewpoint of the displayed network structure using an input from a user.

5. A method in accordance with claim 1 further comprising connecting at least a portion of the plurality of network nodes by edges to a predecessor node and a successor node.

6. A method in accordance with claim 1 further comprising determining a first set of concurrent nodes by selecting nodes which are not successors of any edge in the network.

7. A method in accordance with claim 1 further comprising determining a second set of concurrent nodes by selecting nodes which are successors only of edges whose predecessors are contained in the first set of concurrent nodes.

8. A method in accordance with claim 1 further comprising determining a subsequent set of concurrent nodes by selecting nodes which are successors only for edges for which the predecessors are contained in the previous concurrent sets of nodes.

9. A method in accordance with claim 1 further comprising determining for each set of concurrent nodes, those edges for each node where that node is a predecessor and the successor node of the edge is in the nearest following set of concurrent nodes where the resulting set of edges is not empty.

10. A method in accordance with claim 1 further comprising positioning single zero slack-value nodes in positions on the central time-directed axis in the order which the concurrent sets were constructed.

11. A method in accordance with claim 10 further comprising positioning other ones of the plurality of nodes using a force-directed layout method.

12. A method in accordance with claim 10 further comprising positioning the other ones of the plurality of nodes on a plane that is substantially perpendicular to the central time-directed axis.

13. A method in accordance with claim 10 further comprising modeling the earliest following edges of each node as physical springs and modeling the nodes within each concurrent set to repel each other.

14. A system for displaying a scheduling model as a network structure comprising:
    a database embodied on a computer readable media, said database comprising data relating to a feed-forward network and force-directed layout computations for the network; and
    a processor configured to receive data from said database, said processor comprising:
        a sequencing component configured to partition the feed-forward network into sets of concurrent nodes and determine a slack value for each node; and
        a layout management component configured to simulate the application of forces to each set of concurrent nodes to determine the spatial arrangement of the sets of nodes and to determine a distance of each node from a central time-directed axis based at least partially on the slack value.

15. A system in accordance with claim 14 further comprising an animation and viewing component implemented on a desktop computer equipped with hardware and software capable of displaying three-dimensional graphical representations of the network.

16. A system in accordance with claim 14 further comprising applying the force-directed computations to sets of concurrent nodes individually such that overall computation time is limited.

17. A computer readable medium encoded with a program configured to:
    instruct a computer to display a scheduling model as a network structure using force-directed layout wherein the network includes a plurality of nodes positioned along a central time-directed axis using a slack parameter value associated with each node to determine a distance of respective nodes from the central time-directed axis;
    partition the plurality of nodes into sets of concurrent nodes; and
    instruct the computer to apply force-directed computations to each set of concurrent nodes.

* * * * *